US009812145B1

(12) United States Patent
Fox

(10) Patent No.: US 9,812,145 B1
(45) Date of Patent: *Nov. 7, 2017

(54) MOBILE VOICE SELF SERVICE DEVICE AND METHOD THEREOF

(71) Applicant: West Corporation, Omaha, NE (US)

(72) Inventor: Chad Daniel Fox, Omaha, NE (US)

(73) Assignee: West Corporation, Omaha, NE (US)

( * ) Notice: Subject to any disclaimer, the term of this patent is extended or adjusted under 35 U.S.C. 154(b) by 473 days.

This patent is subject to a terminal disclaimer.

(21) Appl. No.: 13/959,065

(22) Filed: Aug. 5, 2013

Related U.S. Application Data

(63) Continuation of application No. 13/657,119, filed on Oct. 22, 2012, now Pat. No. 8,521,536, which is a continuation of application No. 12/138,463, filed on Jun. 13, 2008, now Pat. No. 8,296,148.

(51) Int. Cl.

| | |
|---|---|
| *G10L 15/00* | (2013.01) |
| *G10L 21/00* | (2013.01) |
| *H04M 1/64* | (2006.01) |
| *G06F 15/16* | (2006.01) |
| *G06F 15/173* | (2006.01) |

(52) U.S. Cl.
CPC ............ *G10L 21/00* (2013.01); *G10L 15/00* (2013.01); *H04M 1/64* (2013.01)

(58) Field of Classification Search
CPC ........ G10L 15/00; G10L 15/28; G10L 15/30; G10L 15/34; G10L 15/32; G10L 2015/00; G10L 13/00; G10L 13/04; G10L 13/043; H04M 3/4936; H04M 2207/40; H04M 2201/39; H04M 2201/40; H04M 15/41; H04L 5/0032; H04L 65/1066

USPC ............... 704/231, 234, 270.1, 270, 275; 379/88.01, 88.17, 88.18
See application file for complete search history.

(56) References Cited

U.S. PATENT DOCUMENTS

| | | | |
|---|---|---|---|
| 6,546,096 B1 | 4/2003 | Meiden et al. | |
| 6,934,756 B2 * | 8/2005 | Maes | 709/227 |
| 7,028,306 B2 * | 4/2006 | Boloker et al. | 719/310 |
| 7,054,818 B2 * | 5/2006 | Sharma et al. | 704/270 |

(Continued)

OTHER PUBLICATIONS

Anderson, Paul. "Mobile and PDA Technologies: Looking around the corner." JISC Technology & Standards Watch (2005).*

*Primary Examiner* — Paras D Shah
(74) *Attorney, Agent, or Firm* — Raffi Gostanian

(57) ABSTRACT

A Mobile Voice Self Service (MVSS) mobile device and method thereof. A VoiceXML browser that is implemented directly on the MVSS mobile device may request a VoiceXML application and process it. A call data manager may also be implemented on the MVSS mobile device and may provide call data that may authorize access to advanced Media Resource Control Protocol (MRCP) services, such as Automatic Speech Recognition (ASR) or Text-To-Speech (TTS). A media resource gateway may then provide the advanced MRCP services to the VoiceXML application processed by the VoiceXML application browser. Hotkey navigations and bookmarked application points to VoiceXML applications may be created and applied through application analysis and state tracking. Therein, VoiceXML document transitions and user input are stored to maintain application state changes until the user requests creation of an application bookmark.

16 Claims, 6 Drawing Sheets

(56) References Cited

U.S. PATENT DOCUMENTS

| | | | |
|---|---|---|---|
| 7,099,442 B2* | 8/2006 | Da Palma et al. | 379/88.22 |
| 7,158,936 B2* | 1/2007 | Denenberg et al. | 704/270.1 |
| 7,174,297 B2* | 2/2007 | Guerra et al. | 704/270.1 |
| 7,216,351 B1* | 5/2007 | Maes | 719/328 |
| 7,308,083 B2 | 12/2007 | Bettis et al. | |
| 7,412,038 B2* | 8/2008 | Creamer et al. | 379/88.13 |
| 7,436,939 B1* | 10/2008 | Packingham et al. | 379/88.12 |
| 7,519,536 B2* | 4/2009 | Maes | H04L 29/06027 704/231 |
| 7,529,675 B2* | 5/2009 | Maes | 704/270.1 |
| 7,546,382 B2* | 6/2009 | Healey et al. | 709/246 |
| 7,571,100 B2* | 8/2009 | Lenir et al. | 704/270.1 |
| 7,715,547 B2* | 5/2010 | Ibbotson et al. | 379/265.02 |
| 8,107,598 B2* | 1/2012 | Skakkebaek et al. | 379/88.13 |
| 2002/0095473 A1* | 7/2002 | Berkowitz et al. | 709/217 |
| 2002/0193997 A1* | 12/2002 | Fitzpatrick et al. | 704/270 |
| 2003/0125958 A1* | 7/2003 | Alpdemir et al. | 704/275 |
| 2003/0187658 A1* | 10/2003 | Selin et al. | 704/270.1 |
| 2004/0230637 A1* | 11/2004 | Lecoueche et al. | 709/200 |
| 2005/0137875 A1* | 6/2005 | Kim et al. | 704/270.1 |
| 2005/0234727 A1* | 10/2005 | Chiu | 704/270.1 |
| 2006/0098792 A1* | 5/2006 | Frank et al. | 379/70 |
| 2006/0177023 A1* | 8/2006 | Vaghar et al. | 379/88.17 |
| 2007/0150902 A1* | 6/2007 | Meyer et al. | 719/313 |
| 2008/0084989 A1 | 4/2008 | Dhanakshirur | |
| 2008/0026711 A1 | 10/2008 | Stern | |
| 2008/0317232 A1 | 12/2008 | Couse et al. | |
| 2009/0171659 A1* | 7/2009 | Pearce et al. | 704/235 |

* cited by examiner

MOBILE VOICE SELF SERVICE DEVICE AND METHOD THEREOF

CROSS-REFERENCE TO RELATED APPLICATIONS

This application is a continuation from U.S. patent application Ser. No. 13/657,119, filed Oct. 22, 2012, and entitled MOBILE VOICE SELF SERVICE DEVICE AND METHOD THEREOF, which is a continuation from U.S. patent application Ser. No. 12/138,463, filed Jun. 13, 2008, and entitled MOBILE VOICE SELF SERVICE DEVICE AND METHOD THEREOF, now issued U.S. Pat. No. 8,296,148, all of which are incorporated by reference herein in their entirety.

BACKGROUND OF THE INVENTION

The present invention relates to a system and method for processing an application via an application browser that is implemented on a mobile device. More particularly, the present invention relates to a Mobile Voice Self Service (MVSS) mobile device and method for processing a VoiceXML application via a VoiceXML application browser implemented directly on the MVSS mobile device.

In telephony, Interactive Voice Response (IVR) is a technology that allows a computer to detect voice and touch tones in a telephone call.

Many companies employ systems based on IVR technology to process and route telephone calls originating from their respective customers. Examples include telephone banking, televoting, and credit card transactions. IVR systems are typically used to service high call volumes, reduce cost and improve the customer experience.

If a customer dials a telephone number that is answered by an IVR system, the system executes an application that responds to the customer/caller with pre-recorded or dynamically generated audio files. These audio files explain the options available to the caller and direct the caller on how to proceed. The caller selects an option by using spoken words or Dual-Tone Multi-Frequency (DMTF) tones, e.g., telephone keypad touch tones.

Modern IVR applications are structured similar to World Wide Web pages, using languages such as VoiceXML. Other languages may include, for example, SALT or T-XML.

Since many companies do not have their own IVR platforms, they typically turn to outsourcing companies or vendors to either host their VoiceXML application or manage the application as a whole. An example of such a hosted environment is shown in FIG. 1.

The hosted environment shown in FIG. 1 may include end user devices, such as a mobile device 105 or a land-line phone 110; hosted vendor systems 115; and client systems 120. The mobile device 105, such as a cellular phone, PDA, or iPhone, and/or the land-line phone 110 may communicate with the hosted vendor systems 115 via a telephony interface 125. The telephony interface 125, in turn, interacts with a VoiceXML browser 130, a MRCP TTS Server 135, and a MRCP Speech Recognition Server 140, all of which are part of the hosted vendor systems 115.

The VoiceXML browser 130 may be an extension of a web browser that presents an interactive voice user interface to the user and that operates on pages that specify voice dialogs. These pages may be written in VoiceXML language, which is the W3C's standard voice dialog markup language, but other proprietary voice dialog languages may be used. The VoiceXML browser 130 may present information aurally, using pre-recorded audio file playback or using Text-To-Speech (TTS) software to render textual information as audio. Further, the VoiceXML browser 130 may obtain information from the end user of the mobile device 105 and/or the land-line phone 110 by speech recognition and keypad entry, e.g., DTMF detection.

The VoiceXML browser 130 interacts with the MRCP TTS Server 135 and the MRCP Speech Recognition Server 140. MRCP stands for Media Resource Control Protocol, which is a communication protocol that allows speech servers to provide various speech services, such as speech recognition, speech synthesis, and TTS to its clients. The MRCP TTS Server 135 provides TTS services to its clients, and the MRCP Speech Recognition Server 140 provides speech recognition services to its clients.

Computer Telephone Integration (CTI) data are sent from the hosted vendor systems 115 to a CTI Management Server 145. CTI is a technology that allows interactions on a telephone and a computer to be integrated or coordinated. As contact channels have expanded from voice to email, web, and fax, CTI has expanded to include the integration of all customer contact channels (voice, email, web, fax, etc.) with computer systems. Common functions that may be implemented using CTI are, for example, call routing, call information display with or without using calling line data, phone control (answer, hang up, hold, conference, etc.), automatic dialing and computer-controlled dialing, etc.

Furthermore, application requests are sent from the VoiceXML Browser 130 to a VoiceXML Application Server 150, and the requested VoiceXML application is delivered from the VoiceXML Application Server 150 to the VoiceXML Server 130. The CTI Management Server 145 and the VoiceXML Application Server 150 are both part of the client systems 120.

More and more people use intelligent mobile devices, such as cellular phones, PDAs, or iPhones, as a means of communication. These intelligent mobile devices become more and more sophisticated due to, for example, increased computing power or memory capacity, and due to, for example, the availabilty of mobile Software Development Kits (SDKs), such as Java Platform, Micro Edition (Java ME) or Apple's iPhone SDK. This may lead to decreased reliance on teleservices companies that are built on standard telephony technology. More particularly, this may lead to decreased reliance on hosted environments for IVR applications, for example.

BRIEF SUMMARY OF THE INVENTION

The present invention, in exemplary embodiments, overcomes the above disadvantages and other disadvantages not described above. Also, the present invention is not required to overcome the disadvantages described above, and an exemplary embodiment of the present invention may not overcome any of the problems described above.

Thus, in one aspect, the present invention is directed to a Mobile Voice Self Service (MVSS) mobile device that may include an application browser, a call data manager, and a media resource gateway. The application browser, such as a VoiceXML browser, may process an application, such as a VoiceXML application, that may be requested by a user of the mobile device from an application server. The call data manager may provide call data that, in conjunction with data from the application server, authorize access to advanced Media Resource Control Protocol (MRCP) services. The media resource gateway may then provide the advanced MRCP services to the application processed by the application browser.

In another aspect, the present invention is directed to a method for processing an application on an MVSS mobile device, wherein an application browser that is implemented on the MVSS mobile device requests an application from an application server. A call data manager, also implemented on the MVSS mobile device, provides call data that, in conjunction with data from the application server, authorize access to advanced MRCP services. The advanced MRCP services are then provided to the application requested by the application browser.

In yet another aspect, the present invention is directed to a method for creating and applying hotkey navigations and bookmarked application entry points to VoiceXML applications through application analysis and state tracking. Therein, VoiceXML document transitions and user input are stored to maintain application state changes until the user requests creation of an application bookmark.

The present invention may allow companies requiring only a basic, DTMF-only IVR application to host their VoiceXML application on their existing web infrastructure and provide users of mobile devices access to the same IVR functionality that would normally need to be provided by an outsourced vendor. Companies requiring more advanced features as part of their IVR application may still benefit from the present invention by moving the call handling and VoiceXML processing off of a hosted platform and only using an outsourced vendor to perform advanced features such as speech recognition, natural language, or text-to-speech. Alternatively, the present invention may allow companies to move both basic, DTMF-only IVR applications and IVR applications with advanced features off of the hosted platform to their existing web infrastructure.

BRIEF DESCRIPTION OF THE SEVERAL VIEWS OF THE DRAWING

In the following section, the invention will be described with reference to exemplary embodiments illustrated in the attached Figures, in which.

DETAILED DESCRIPTION OF THE INVENTION

Reference will now be made in detail to exemplary embodiments of the present invention, examples of which are illustrated in the accompanying drawings.

Given the rapidly increasing processing power of mobile devices and the availability of mobile SDKs, a hosted application browser of the related art, such as a hosted VoiceXML browser, may be moved directly to an end user's mobile device. In other words, an application browser, such as a VoiceXML browser, and other, associated components may be deployed as a mobile application and implemented on the mobile device to allow a VoiceXML application to be processed directly on the mobile device. This concept may also be known as Mobile Voice Self Service (MVSS).

MVSS may provide the benefit of reduced cost or, in the case of simple applications, no hosting cost to companies, for example. In addition, the end-user features that MVSS provides may allow applications to become more user-friendly.

Figure 1:
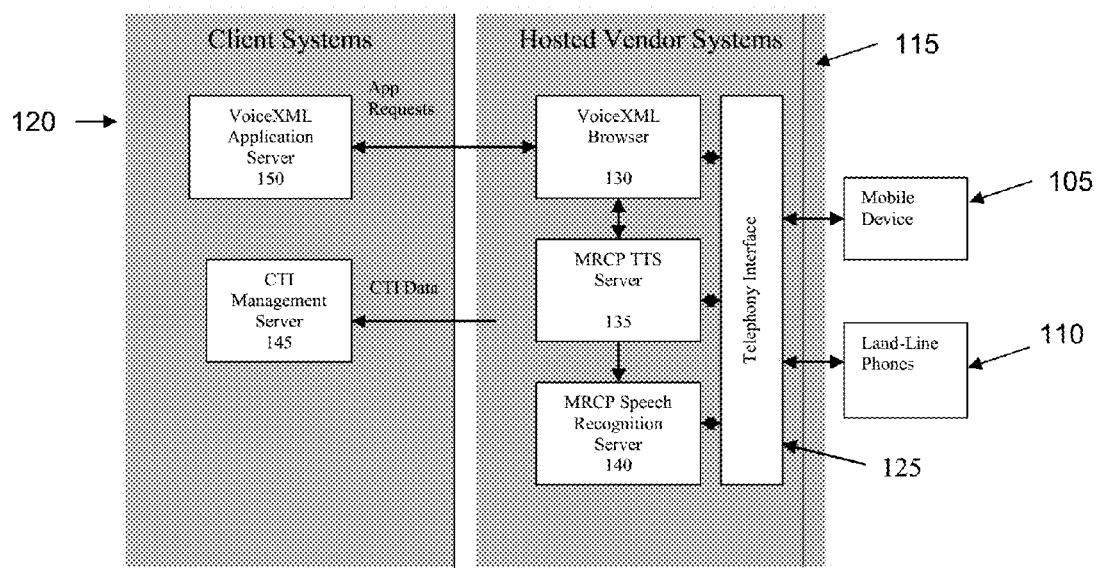
FIG. 1 illustrates a hosted environment for IVR applications as it may be known in the related art.
Figure 2:
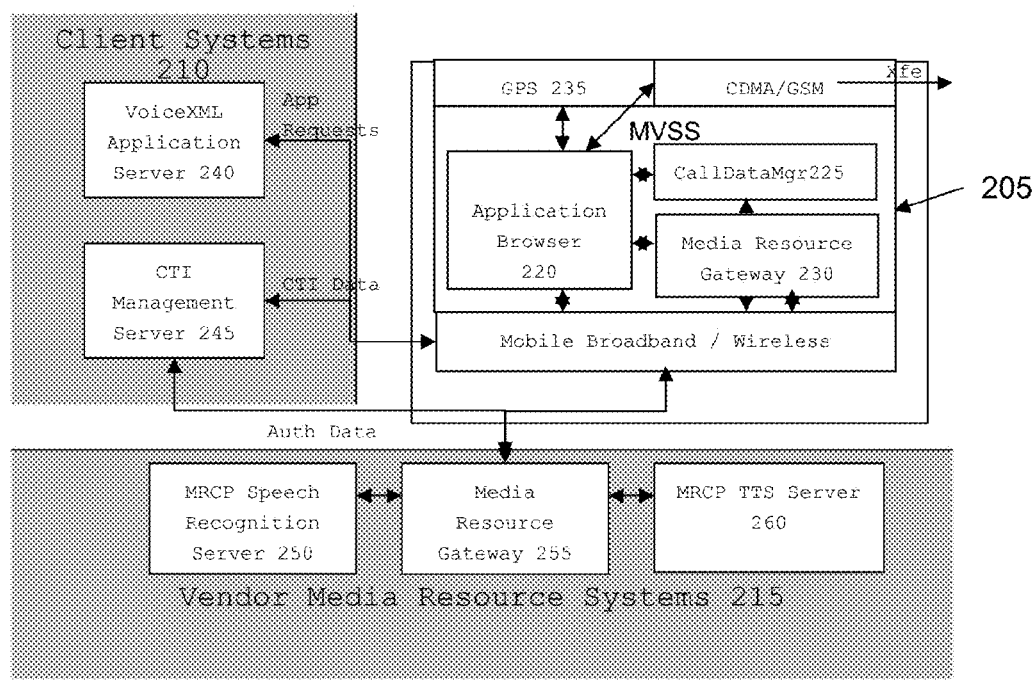
FIG. 2 illustrates a Mobile Voice Self Service (MVSS) system in accordance with an exemplary embodiment of the present invention.

FIG. 2 illustrates an MVSS system in accordance with an exemplary embodiment of the present invention.

As shown in FIG. 2, a mobile device 205 communicates with client systems 210 and media resource systems 215 of a vendor. The mobile device 205 may include an Application Browser 220 that interacts with a Call Data Manager 225 and a Media Resource Gateway 230. The Call Data Manager 225 and the Media Resource Gateway 230 may also be included in the mobile device 205. These components may utilize the mobile device's 205 mobile broadband or wireless connection to communicate with the client systems 210 or the service vendor's media resource systems 215. The mobile device 205 may be, for example, a cellular phone, a PDA, or an iPhone, and may operate, for example, in a CDMA or GSM network. The mobile device 205 may also include a GPS component 235 to provide, for example, location-based services to the user of the mobile device 205.

As is the case in the related art, the client systems 210 may include a VoiceXML Application Server 240 and a CTI Management Server 245. The vendor's media resources systems 215 may include an MRCP Speech Recognition Server 250, a Media Resource Gateway 255, and a MRCP TTS Server 260.

The Application Browser 220 of the mobile device 205 may be a VoiceXML 2.1 compliant browser with a minimal memory footprint and minimal processing overhead. Unlike the VoiceXML browsers used in a hosted environment in the related art, the Application Browser or VoiceXML browser 220 may only need to be able to handle one call. Therefore, the required processing power is significantly reduced. In addition, the VoiceXML browser 220 may be able to handle a majority of the call flow required to provide an IVR application to the user of the mobile device 205. The VoiceXML browser 220 may send application requests to the VoiceXML Application Server 240, and the requested VoiceXML application may be delivered from the VoiceXML Application Server 240 to the VoiceXML browser 220.

The Call Data Manager 225 may communicate important telephony events to the client systems 210, in particular to the CTI Management Server 245. Such telephony events may include, for example, set up, deliver (ringing), establish (answer), clear (hang up), end, hold, retrieve from hold, conference, transfer, forward, etc. When a legitimate call is being processed on the mobile device 205, the CTI data provided by the Call Data Manager 225 may be used, in conjunction with data of the VoiceXML Application Server 240, to authorize access to advanced MRCP features. The advanced MRCP features may include automatic speech recognition (ASR) that may be provided by the MRCP Speech Recognition Server 250 or Text-To-Speech (TTS) that may be provided by the MRCP TTS Server 260, for example. Proper authentication may be important because MRCP features may be charged per transaction by the vendor. Also, the Call Data Manager 225 may be important with respect to transfers. Transfers that usually depend on a carrier's advanced features may need to be implemented by other means, so it may be necessary for User-to-User Information (UUI) and other call data to be transferred out-of-band.

The Media Resource Gateway 255 may provide advanced services, such as ASR or TTS to the application, by bridging communication between the VoiceXML browser 220 and the MRCP services. As part of authorizing communication to media resources, MRCP requests from the VoiceXML browser 220 may be directed through the Media Resource Gateway 255. The gateway layer may handle authentication and then host the MRCP communication through the established channel. If the mobile device 205 is capable of processing speech or generating TTS on its own, resources not requiring vendor-specific handling may be passed off to the mobile device 205 by the Media Resource Gateway 230, thereby saving the application provider additional advanced service fees.

To facilitate the configuration of MVSS components prior to running a VoiceXML document, a Mobile Voice Self Service configuration file may be used. This file may be an xml-based configuration file that contains the configuration settings of the Media Resource Gateway 230 and the Call Data Manager 225 as well as the URL of the intended VoiceXML target.

Having a unique file type for voice applications targeted to mobile devices may also be useful in allowing seamless integration of MVSS into a web environment. A mobile device may automatically launch the MVSS application when the user follows a link that provides MVSS content. The format of such a file may be defined, published and validated via standard xml validation methods.

Simple blind transfers may be accomplished by allowing the MVSS application to access the phone's system APIs (Application Programming Interfaces) to simply dial the transfer number. More complicated transfers may require functions that may be unavailable within the realm of the mobile device's capabilities on the mobile carrier's network. To implement these transfers may require dialing a toll-free number that has carrier-advanced features and then utilizing CTI data to execute the transfer.

The following may be exemplary applications of MVSS that may be advantageous to, for example, the end users, vendors, service providers, companies and clients involved.

With respect to access to IVR applications, in the case of MVSS, the user may be allowed to access applications via web URLs rather than phone numbers. A client's site may list individual URLs for each subsection of their application, giving the user direct access to billing or technical support features, without the need for the client to have individual phone numbers for each service. Having direct access to the VoiceXML interpretation allows the user to easily "pause" the IVR, and it may be relatively simple to provide a complete range of controls a user would normally be accustomed to with other media, such as fast forward, rewind, etc.

Figure 3:
FIG. 3 illustrates an MVSS VoiceXML Navigation situation in accordance with an exemplary embodiment of the present invention.

Instead of having to rely on the application's menu repeat options, the user may interact with the browser instructing it to scan through a prompt in reverse, go back to the beginning of the current prompt or menu, or even go to a previous menu and either accept the user's original response again or provide new input. To support such features, when it comes to application reporting, it may be beneficial to create new VoiceXML events that the browser can handle, so reporting can accurately reflect the user's navigation. FIG. 3 shows an exemplary illustration of MVSS VoiceXML Navigation.

Having direct access to the call flow data may allow implementing user-defined hotkeys or "bookmarks" in a VoiceXML application. If the user would like to return to a portion of an application at a later time, he or she may press a hotkey capture button, which may then suspend the running VoiceXML application. The MVSS browser may store the current state and the input required to reach that state. After speaking or entering a bookmark identifier, the application may resume normally. At a later time, the user may request access to the bookmark, and this may instruct MVSS to load the application and automatically proceed to the bookmarked state if modifications to the applications do not prevent it. In the case where the application has been modified, MVSS may provide a message to the user indicating the bookmark needs to be updated; present the user with the prompt where the application changed; and wait for the user to indicate that he or she has once again reached the point in the application the user wishes to bookmark.

Location-based services is another area in which having the MVSS browser running directly on the mobile device may be of advantage. Providing location-based information to customers may mean to add more value in the mobile realm. Rather than relying on complicated data exchanges to determine the location of the caller, the browser may directly access the device's GPS or tower based coordinates and pass them on to the application server. This may all be done as part of the initial request to the application server. Self-service applications may then be catered for the caller's current location prior to even the first prompt.

Figure 4:
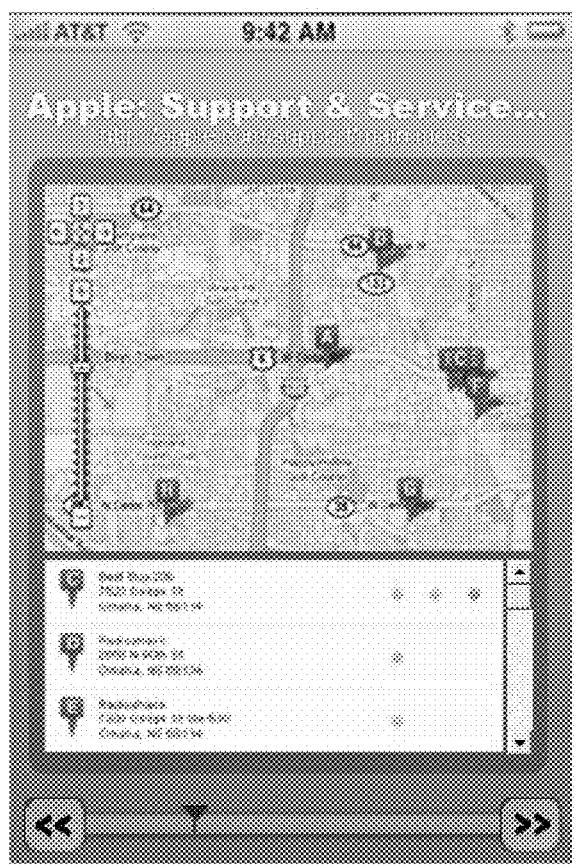
FIG. 4 illustrates incorporation of multimedia data into MVSS in accordance with an exemplary embodiment of the present invention.

Multimedia resources, as illustrated, for example, in FIG. 4, may be referenced within the VoiceXML application, allowing the mobile device to display supplemental data during the progress of the call. This may be utilized by providing an image of the caller's current billing statement when the caller requests payment information; by providing a video clip of the steps required to reset a satellite receiver when the caller is requesting technical support; or even by launching a web page with a registration form when the caller wants to enroll in some special program. There may also be the branding aspect that may be important to many companies, so a company logo, customer notifications, or advertising may be displayed on the mobile device while working with their IVR.

In the VoIP world, it may be common for a conference call to be presented along with video conferencing or a shared desktop for a presentation. MVSS may add functionality in the voice self-service world because the multimedia may also interact back with the IVR. For example, if the caller has a question about their bill, MVSS may display the caller's recent billing statement on the screen and allow the user to select the billing line-item the caller has a question about and say "What is this charge"? Again, due to the fact that the VoiceXML interpretation is happening locally on the caller's phone, the act of selecting an item on the screen may be passed to the browser as input without complex data exchanges. This sort of interaction may be simplified because MVSS is just a single system that accepts multiple forms of input.

MVSS technology may be an industry standard that may be implemented by mobile device builders as part of their devices' core features.

There may be several versions of MVSS to support various mobile device architectures. Open development environments like Java ME may aid in that sort of development, but each device may require its own special development for its unique features or hardware.

Figure 5:
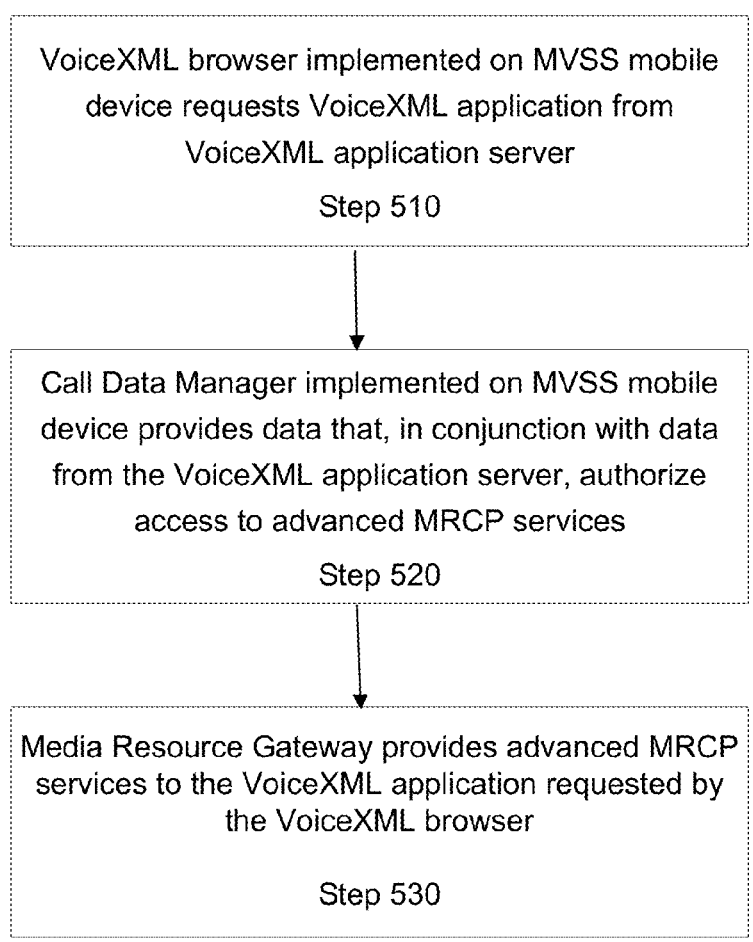
FIG. 5 illustrates a method in accordance with an exemplary embodiment of the present invention.

FIG. 5 illustrates a method in accordance with an exemplary embodiment of the present invention. In step 510, an application browser that is implemented on an MVSS mobile device may request an application from an application server. The application browser may be a VoiceXML browser; the application may be a VoiceXML application; and the application server may be a VoiceXML application server.

In step 520, a call data manager may provide call data. The call data manager may also be implemented on the MVSS mobile device. The call data, in conjunction with data from the application server, may authorize access to advanced MRCP services such as ASR or TTS.

In step 530, the advanced MRCP services may be provided to the application that was requested by the application browser. The advanced MRCP services may be provided by a media resource gateway.

Figure 6:
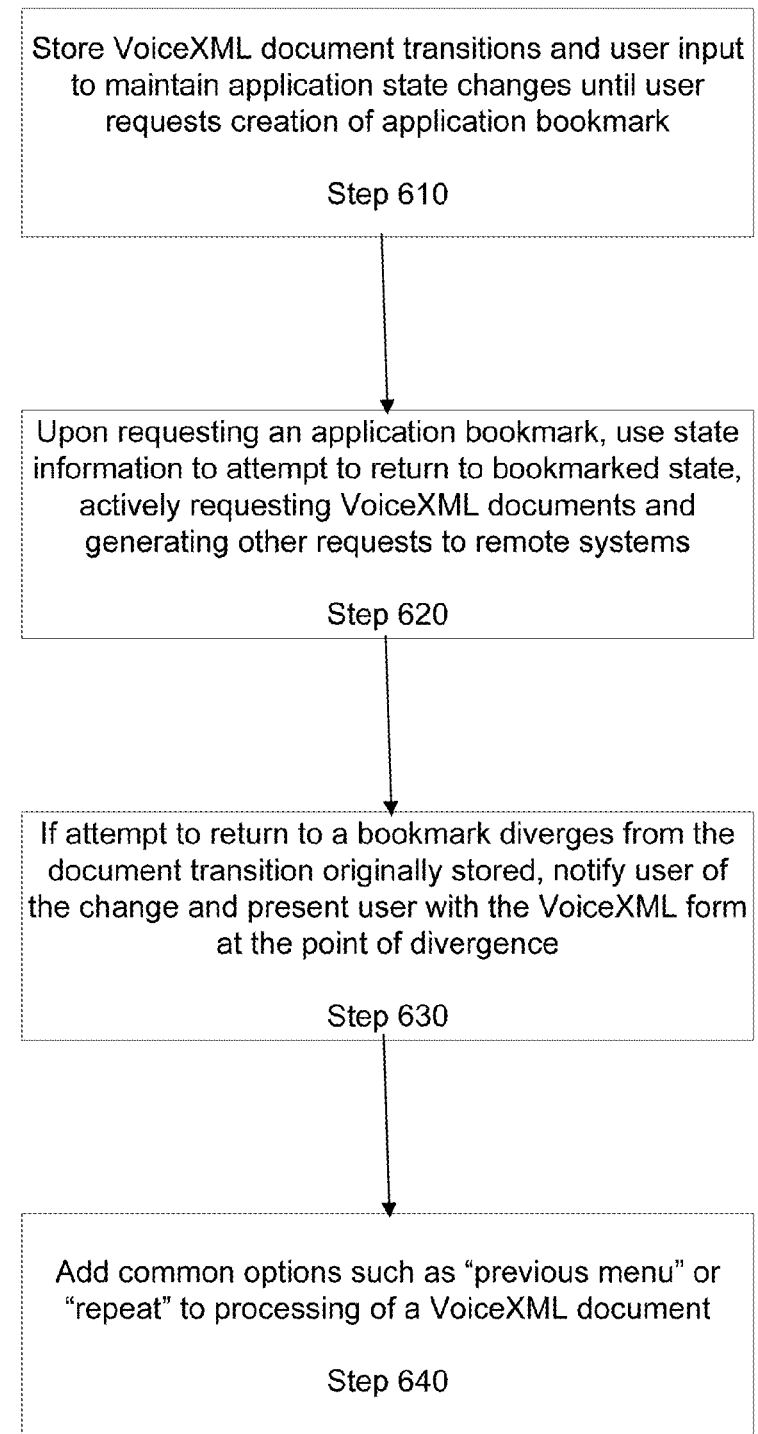
FIG. 6 illustrates a method for automatic hotkey generation and bookmarking for VoiceXML applications in accordance with an exemplary embodiment of the present invention.

Further, hotkey navigations and bookmarked application entry points to VoiceXML applications may be created and applied through application analysis and state tracking. As shown in FIG. 6, a mechanism for storing 610 VoiceXML document transitions and user input may maintain application state changes up to the point where a user requests an application bookmark to be created. Upon requesting 620 an application bookmark, the state information may be used to attempt to return to the bookmarked state, actively requesting the VoiceXML documents and generating any other requests to remote systems.

In the event that an attempt to return to a bookmark diverges 630 from the document transition originally stored, the user may be notified of the change and presented with the VoiceXML form at the point of the divergence.

Further, an additional processing phase may be added to the processing of a VoiceXML document to automatically add 640 common options such as "previous menu" or "repeat."

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A mobile device, comprising:
    an application browser that executes within the mobile device to process an application, wherein the application is a Voice XML interpretation of an Interactive Voice Response application;
    an application server that provides the application;
    a call data manager that executes within the mobile device to provide call data that, in conjunction with data from the application server, authorizes access to advanced Media Resource Control Protocol (MRCP) services; and
    a media resource gateway that executes within the mobile device to provide the advanced MRCP services to the application processed by the application browser, and which utilizes a mobile broadband wireless connection to communicate with at least one remote vendor resource server which provides at least one of automatic speech recognition and text to speech to the application and which bridges communication between the application browser and the advanced MRCP services.

2. The device as claimed in claim 1, wherein the application browser comprises at least one of: a VoiceXML browser and a VoiceXML application.

3. The device as claimed in claim 1, further comprising a Global Positioning System (GPS) component to provide location-based services to the mobile device.

4. The device as claimed in claim 1, wherein the mobile device is operable in at least one of a Code Division Multiple Access (CDMA) network and a Global System for Mobile Communications (GSM) network.

5. The device as claimed in claim 1, wherein the mobile device comprises at least one of a cellular telephone, a Personal Digital Assistant (PDA), and an iPhone.

6. The device as claimed in claim 1, wherein the call data manager is operable to communicate telephony events associated with a telephone call of the mobile device to a CTI management server.

7. The device as claimed in claim 1, wherein the media resource gateway is operable to process MRCP requests from the application browser.

8. A method, comprising:
    requesting an application via an application browser implemented on a mobile device, wherein the application is a Voice XML interpretation of an Interactive Voice Response application;
    providing call data from a call data manager implemented on the mobile device, wherein the call data, in conjunction with data from the application server, authorize access to advanced Media Resource Control Protocol (MRCP) services; and
    providing the advanced MRCP services to the application requested by the application browser via a media resource gateway operating on the mobile device;
    providing at least one of automatic speech recognition and text-to-speech to the application via the media resource gateway; and
    utilizing, via the media resource gateway, a mobile broadband wireless connection to communicate with at least one remote vendor resource server which provides at least one of automatic speech recognition and text to speech to the application and which bridges communication between the application browser and the advanced MRCP services.

9. The method as claimed in claim 8, wherein the application is requested via a VoiceXML browser and the application browser.

10. The method as claimed in claim 8, further comprising providing Global Positioning System (GPS) location-based services to the mobile device.

11. The method as claimed in claim 8, wherein the mobile device operates in at least one of a Code Division Multiple Access (CDMA) network and a Global System for Mobile Communications (GSM) network.

12. The method as claimed in claim 8, wherein the application is requested, via the application browser, by at least one of a cellular telephone, a Personal Digital Assistant (PDA), and an iPhone.

13. The method as claimed in claim 8, further comprising creating and applying at least one of: hotkey navigations and bookmarked application entry points, to the VoiceXML application.

14. The method as claimed in claim 13, further comprising storing VoiceXML document transitions to maintain application state changes until a request for creation of an application bookmark is received.

15. The method as claimed in claim 14, further comprising:

upon requesting the return to the application bookmark, using the state changes to attempt to return to at least one of the bookmarked application entry points;

requesting the VoiceXML document;

generating predetermined requests to a least one remote system; and if the attempt to return to at least one of the bookmarked application entry points diverges from the VoiceXML document transitions, presenting a VoiceXML form at the point of divergence.

16. A non-transitory computer readable medium comprising instructions for:

requesting an application via an application browser implemented on a mobile device, wherein the application is a Voice XML interpretation of an Interactive Voice Response application;

providing call data from a call data manager implemented on the mobile device, wherein the call data, in conjunction with data from the application server, authorize access to advanced Media Resource Control Protocol (MRCP) services;

providing the advanced MRCP services to the application requested by the application browser via a media resource gateway operating on the mobile device;

providing at least one of automatic speech recognition and text-to-speech to the application via the media resource gateway utilizing, via the media resource gateway, a mobile broadband wireless connection to communicate with at least one remote vendor resource server which provides at least one of automatic speech recognition and text to speech to the application and which bridges communication between the application browser and the advanced MRCP services.

* * * * *